(12) United States Patent
El-Sherif

(10) Patent No.: US 7,149,391 B1
(45) Date of Patent: Dec. 12, 2006

(54) ON-FIBER TUNABLE COUPLER AND HIGH SPEED SWITCH FOR TELECOMMUNICATION APPLICATIONS

(75) Inventor: Mahmoud A. El-Sherif, Penn Valley, PA (US)

(73) Assignee: Photonics On-Fiber Devices, Inc., Philadelphia, PA (US)

( * ) Notice: Subject to any disclaimer, the term of this patent is extended or adjusted under 35 U.S.C. 154(b) by 50 days.

(21) Appl. No.: 11/195,211

(22) Filed: Aug. 1, 2005

(51) Int. Cl.
*G02B 6/26* (2006.01)
(52) U.S. Cl. ............................. 385/50; 385/15; 385/39
(58) Field of Classification Search ................ 385/15, 385/39, 50
See application file for complete search history.

(56) References Cited

U.S. PATENT DOCUMENTS 5,060,307 A * 10/1991 El-Sherif ................... 398/200
6,603,902 B1 * 8/2003 So ............................. 385/37

* cited by examiner

*Primary Examiner*—Jennifer Doan
(74) *Attorney, Agent, or Firm*—John S. Munday

(57) ABSTRACT

An on-fiber tunable coupler and switch for communication systems. Two optical fibers are modified by replacing passive cladding with at least an inner metallic electrode, an electrooptic material layer on the inner electrode, and an outer metallic electrode on the electrooptic material. The optical fibers are positioned close to each other. More layers can be coated between any of these layers to improve the interface properties or reflectivity. The presence of an electric signal, will change the optical properties of the modified cladding, as will the propagation characteristics of the optical signal within one fiber core. This will permit tunable coupling of the signal from the first fiber core to the second fiber core(s). The coupling coefficient between the first and the second fiber(s) is adjustable. Switch-off the signal output from the first fiber to the second fiber is achieved at 100% coupling ratio.

10 Claims, 3 Drawing Sheets
(1 of 3 Drawing Sheet(s) Filed in Color)

ON-FIBER TUNABLE COUPLER AND HIGH SPEED SWITCH FOR TELECOMMUNICATION APPLICATIONS

FIELD OF THE INVENTION

This invention relates to an on-fiber tunable coupler and switch comprising two optical fibers having modified cladding. More particularly, invention relates to a coupler and switch where the coupling coefficient is adjustable by an external electric control signal.

BACKGROUND OF THE INVENTION

Because of the importance of integrated optics in the telecommunication industry, a great deal of effort has been expended to reduce insertion loss associated with coupling a light between integrated optical components and fiber links, to the lowest possible level and with reasonable expenses. Such components are on-fiber modulators, switches, couplers, and distribution devices. There also exists a need for a fiber optic coupler which is tunable for high accuracy, inexpensive, easily fabricated and one which can be used without the problems of coupling the light signal from or to the optical link. This invention is an improvement on U.S. Pat. No. 5,060,307.

have invented such an on-fiber tunable coupler which uses two optical fibers, each having a small region from which the cladding material has been removed. The fibers are then placed parallel and close to each other before they are coated with an active multilayer materials structure in the region of uncladded fibers. The multilayer coating is constructed of at least three layers, a conductive layer coated on the surface of the fiber cores, an electrooptic material coated on the top of the conductive layer (the inner electrode) and a conductive layer coated on the top of the electrooptic material acting as the outer electrode. The advantage of this multilayer coating is that it is sensitive to electromagnetic fields and will satisfy the condition that in the presence of an external electromagnetic field, the optical properties of the modified region will change.

Another advantage is achieved by tuning the optical properties of the electrooptic material which is controlled by applying an external electromagnetic field to the device across the region of coating with the active multilayer materials. The device of this invention can be used as an electromagnetic field sensor for determination of the applied external signal. The active medium or the coated materials in the region of the unclad fibers controls energy transferred between the fibers and provides modulation of the signal transmitted in each optical fiber when an external signal is applied.

Other advantages will appear hereinafter.

SUMMARY OF THE INVENTION

It has now been discovered that the above and other advantages of the present invention may be achieved in the following manner. The invention is directed to the combination of an external signal applied to two modified optical fibers, wherein the optical fibers having a region where the cladding material has been removed and replaced with an active multilayer materials system, where the two modified optical fibers are positioned in parallel to each other to provide close proximity between the fibers at the area where the cladding material has been to produce a modified fibers interaction region.

This invention is directed to an apparatus for coupling optical signal from one fiber to another, switching signal between two fibers or transmitting and distributing an optical signal propagating in an optical fiber. The optical fibers comprises a core surrounded by a passive cladding layer in which each optical fiber has the passive cladding material removed to produce an uncladed section of the fiber or fibers. An active medium comprising of least three layers of active materials is placed on the fiber core. These layers are the inner metallic electrode (or the first electrode) coated on the surface of the optical fiber core, the electrooptic material layer coated on the top of the first electrode, and the outer metallic electrode (or the second electrode) coated on the top of the electrooptic material.

The invention includes a light source means for launching optical signals to the input of the first optical fiber and an external electric signal means applied to the active multi-layer material system for tunable coupling of optical signal from said first optical fiber to second optical fiber or for switching off the light signal transmitted through the fiber. Also included are means for detecting, signal processing, and reading out the light signal transmitted in each optical fiber; and referenced signal means for noise signal elimination and signal stability.

This invention is also directed to a method for modulating, switching, coupling or distributing a light signal being transmitted through an optical fiber consisting of a transparent core surrounded by a cladding layer comprising applying an external signal to a section of the optical fiber which has had the cladding material removed and said section is coated with metallic conductive material and immersed in an active medium comprising an electrooptic active material, such as, liquid crystal or electro-optic polymer or solid state material.

This invention is directed to the device which uses as the applied signal, a signal such as an electrical, magnetic, electromagnetic or microwave applied to the region of uncladding and to a device using solutions having a large electro-optic and/or magneto-optic effect as part of the active medium.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention described herein is shown by reference to the drawings, although it is to be understood that the drawings are referred to only for purposes of illustration and example, and the scope of the invention is not limited thereto. For a more complete understanding of the invention, reference is hereby made to the drawings, in which.

DETAILED DESCRIPTION OF THE PREFERRED EMBODIMENT

Figure 1:
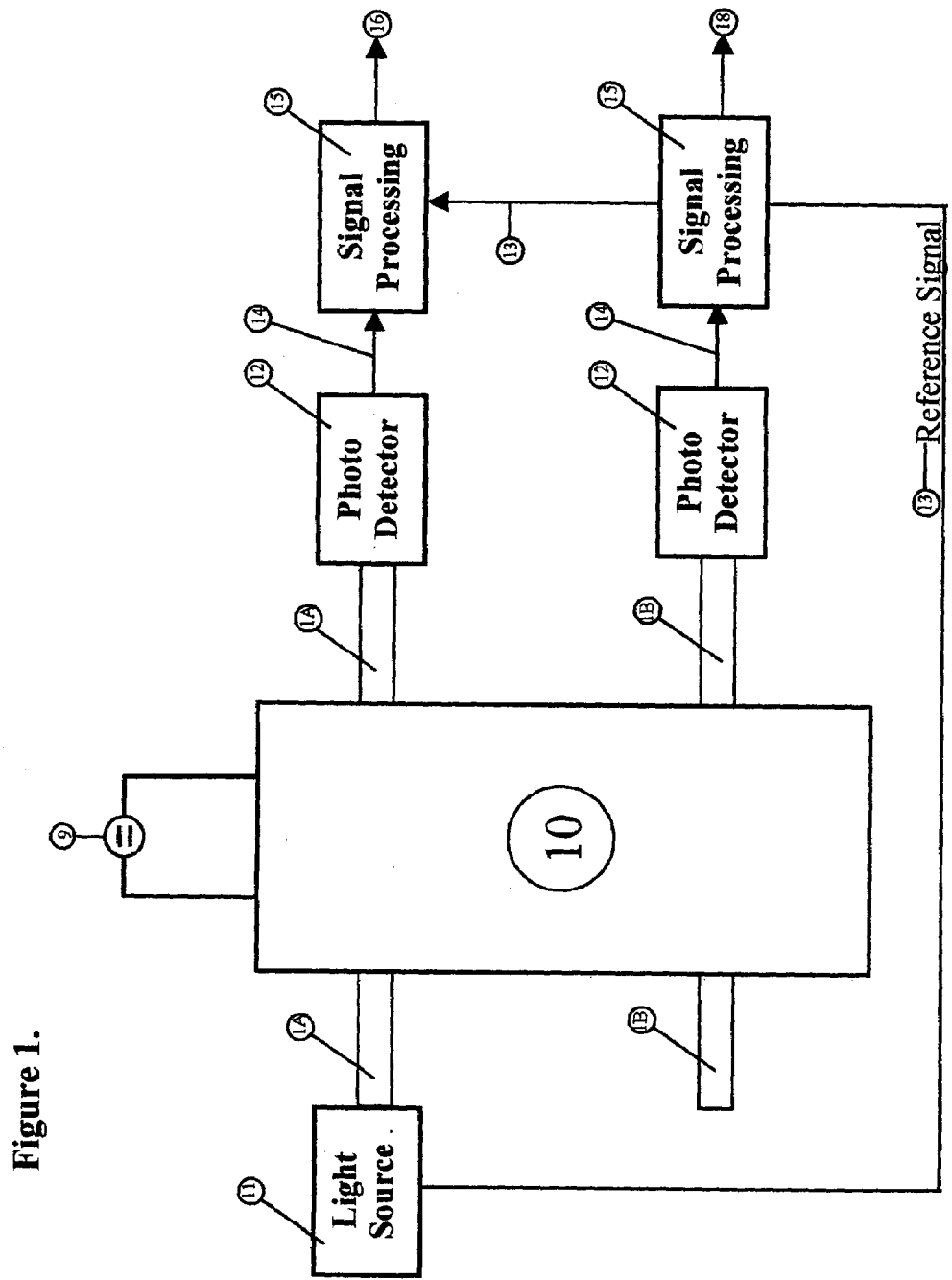
FIG. 1 shows a schematic view of the optical system incorporating a tunable fiber optic coupler and switch.

FIG. 1 shows an optical fiber 1A with a portion of the cladding material removed and replaced with modified cladding 4. A light signal from the light source 11 transmitted in the optical fiber is modulated by an external signal applied by means of connections and two electrodes to the region of modified section and detected by photodetector 12 and processed by means of a signal processing means 15. Device 10 is a high speed tunable coupler and/or switch.

In FIG. 1, the continuous changing of the applied external electromagnetic field results in continuous changing of the optical properties of the modified section which provides optical intensity modulation of the propagating optical signal. Also, the continuous changing of the applied external electromagnetic field results in continuous changing of the coupling coefficient between the two optical fibers. The optical signal coupled from said first optical fiber to said second optical fiber is detected by a photodetector 12 and processed by means of a signal processing means 15. The output 16 of the first optical fiber and the output 18 of the coupled signal to the second fiber can be read out. A reference signal 13 is used to enhance the output and eliminate noise.

Figure 2:
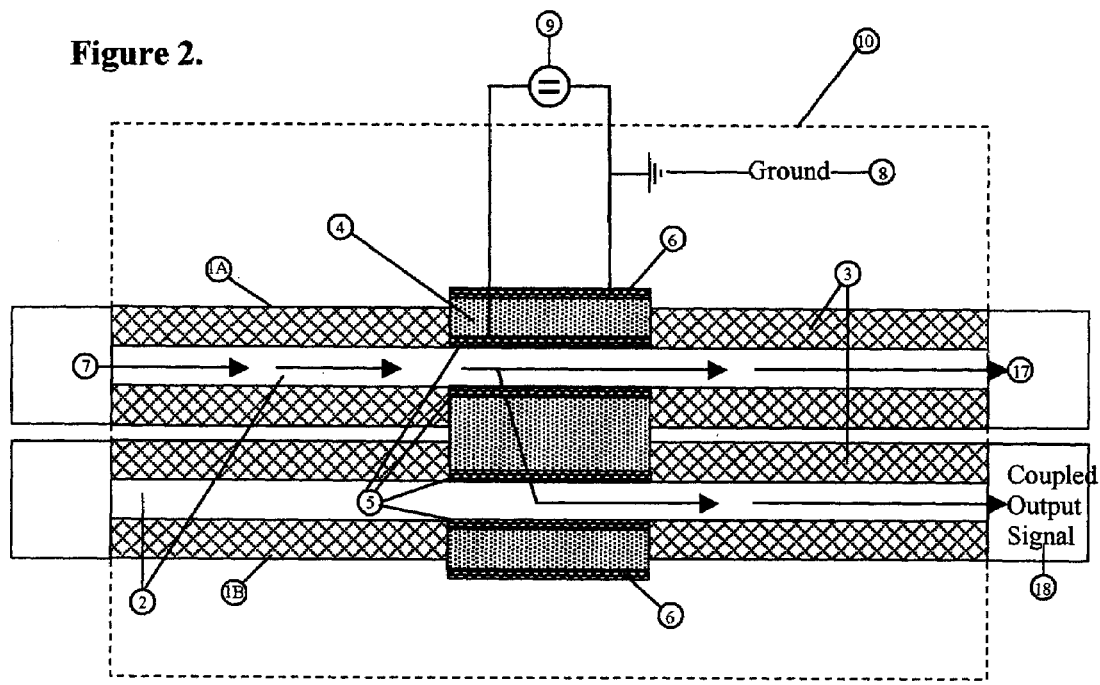
FIG. 2 shows a schematic view of an apparatus of a high speed (2×2) or (1×2) tunable optical coupler and switch.

The moved components of this invention, shown in FIG. 1, can be used as a switch. Switching-off the optical signal in the optical fiber occurs when the applied signal changes the optical properties of the modified section to certain higher values. Also, switching-off the optical signal in the optical fiber occurs when the applied signal changes the phase of the propagating signal by a half wavelength or 180° with respect to the original reference signal. FIG. 2 is a (2×2) or (1×2) tunable optical coupler and switch. FIG. 2 shows two optical fibers 1A and 1B. Optical fiber 1A has had a portion of the fiber cladding 3 removed and replaced with a multilayer modified cladding 4,5, and 6. Optical fiber 1B, also, has had a portion of the fiber cladding 3 removed and replaced with modified cladding 4,5, and 6. An optical signal is transmitted into optical fiber 1A through the optical signal input 7. The signal in fiber 1A is coupled partially or totally to fiber 1B by an external coupling signal applied by means of electrode 5 and 6 to the region of modification. The second electrode 6 is grounded 8. The electrode is used to modulate the optical properties of the modified region. Coupling of the optical signal between fibers 1A and 1B is modulated, i.e. tunable coupling can be achieved. The interacting regions of the two adjacent fibers are coated with at least a three layer structure, inner electrode 5, electrooptic material 4, and outer (or second) electrode 6. FIG. 2 shows the path of the optical signal through fiber core (single mode or multimode) 2 of optical fiber 1A, passing through the modified cladding and then coupled into fiber core 2 of optical fiber 1B. The figure shows the path that the optical fiber takes as it passes from the first fiber to the second fiber. The optical signal propagating in the fiber core 2 is partially (or totally for switches) coupled to the modified cladding where the material properties are modulated by the external signal. At the end of the modified region, the optical signal is distributed between optical fiber 1A and optical fiber 1B. The remaining optical signal in fiber 1A exits fiber 1A through output 17 and the coupled optical signal exits optical fiber 1B through the signal output 18.

Figure 3:
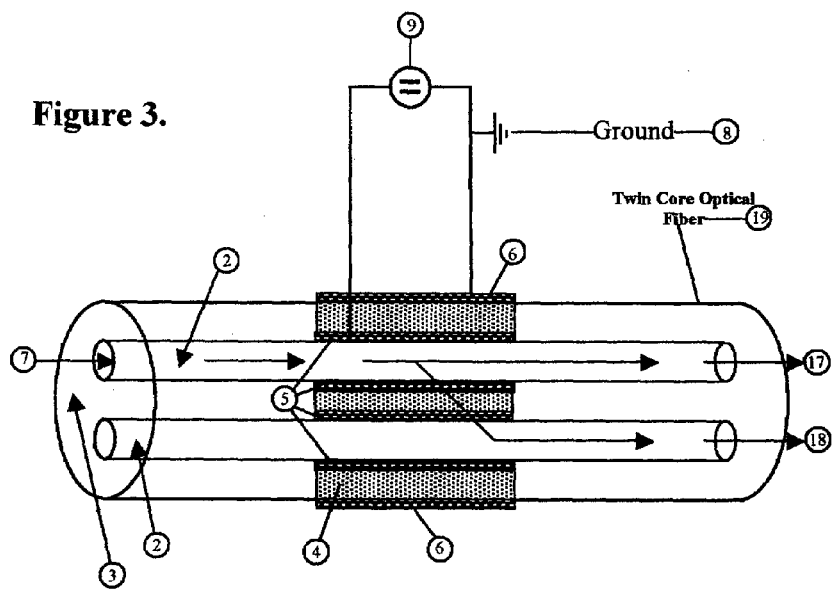
FIG. 3 shows a twin core fiber with identical or two different core indices as an alternate embodiment of the two parallel fibers.

FIG. 3 is an alternate embodiment of FIG. 2. FIG. 3 is a high speed (2×2) or (1×2) tunable optical coupler and/or switch. FIG. 3 shows a twin core fiber with identical or two different core indices and/or diameter as an alternate embodiment of the two parallel fibers. Therefore, the two parallel fibers used in FIG. 2 can be replaced in a small region by a single twin core fiber. The passive cladding can be replaced in a small region by the same multilayer structure described in FIG. 2, where external electromagnetic field can be applied to control the coupling coefficient between the two fiber cores. An optical signal is transmitted into one of the two optical fiber cores through the optical signal input 7. The signal is coupled to the second fiber core using an external microwave, radio frequency, or direct voltage. FIG. 3 shows the path of the optical signal input 7 through the first fiber core (single mode or multimode) 2, passing through the modified cladding and then passing into the second fiber core 2. The figure shows the path that the optical fiber takes as it passes from the first fiber core to the second fiber core. The optical signal propagating in the first fiber core 2 is partially coupled to the modified cladding where the material properties are modulated by the external signal applied to the electrodes 5 and 6. At the end of the modified region, the coupled optical signal can be detected and transmitted. The modulated optical signal exits the first fiber core through output 17 and exits the second fiber core through the coupled signal output 18.

Figure 4:
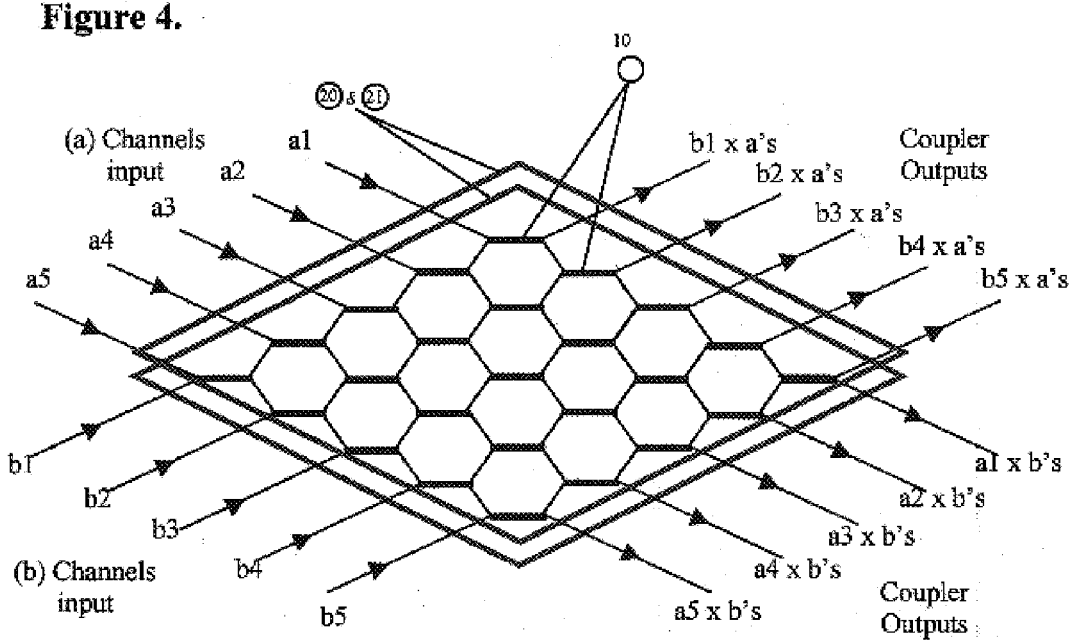
FIG. 4 shows a two dimensional coupler and switch (5×5) or (n×n) array of all-fiber structure.

FIG. 4 shows an all-fiber two dimensional coupler and switch (5×5) or (n×n) array. Each element 10 of the two-dimensional coupler or switch is a (2×2) tunable coupler 10 that could be one of the (2×2) couplers shown in FIGS. 2 and 3. In FIG. 4, a set of input channels (a1–a5) called (a) channels input and a set of input channels (b1–b5) are mixed in an array fashion at the input of 5×5 tunable coupler units 10. The signal at every channel of the 5×5 coupler output is the combination of a.b signals, and can be controlled by controlling the applied voltage to each individual coupler 10.

While particular embodiments of the present invention have been illustrated and described, it is not intended to limit the invention to any specific embodiment except as defined by the following claims.

The invention claimed is:

1. Apparatus selectively operable as a two dimensional array of couplers or switches wherein each element of the array is an on-fiber coupler, said elements are arranged in a series and parallel connections adapted to couple the input signal of any element to the output communication line of any other element in the array, wherein each element is a tunable coupler comprising:

a first optical fiber and a second optical fiber, each of said fibers having a core and a cladding material surrounding the core, and each of said fibers having a region wherein the cladding has been removed to form a region of uncladding, said regions of uncladding being positioned parallel and close to each other while preventing mechanical movement of said fibers in relation to each other;

each fiber core is coated, in said region of uncladding, all over the 360° of the cylindrical surface, with a thin layer of metallic material to construct the inner (or first) electrode on each fiber core;

a layer of an electrooptic material is coated on the tope of each inner (first) electrode and around the two fibers as well as filling the gap between the fibers;

on the top of the electrooptic material, a layer of metallic material is coated allover the surface (360°) to construct the outer (or second) electrode, the inner and outer electrodes are used to apply electromagnetic fields to the electrooptic material in a symmetric radial directions with respect to the two fiber cores; the field lines are oriented in a symmetric configuration with respect to the fibers circular cross section in order to provide a polarization independent coupling;

means for applying an external electric signal to said modified fibers to change said optical properties of the modified region to transfer partially or totally the optical signal from the first optical fiber to the second optical fiber;

a light source means focused to provide an optical communication signal into said first optical fiber and a reference signal;

detector means positioned on said each optical fiber downstream from said light source and said region of modified fiber for detecting optical signals in said optical fiber and said reference signal and transfer optical signals to electrical signals; and signal processing means coupled with said detectors means to amplify and process any output signals of said detectors, wherein said reference signal from light source is used to provide a noise free coupler outputs.

2. The apparatus of claim 1, which further includes elements having additional coating layers between each two layers of those coated materials to improve the interface and the structure properties.

3. The apparatus of claim 1, operable as a two dimensional array of tunable couplers, wherein said means for applying an external electric signal to each element of the array includes means for applying external electromagnetic fields to provide a polarization independent control signal to said modified regions to tune the coupling ratio between said first and second fibers, whereby an optical signal from said light source in said first fiber is partially transferred with an exact ratio to said second fiber.

4. The apparatus of claim 1, operable as a two dimensional array of switches, wherein said means for applying an external electric signal to each element of the array includes means for applying an external electromagnetic field to provide a sufficient continuous field to said modified region in order to switch off signals in first fiber of a specific element of the array.

5. The apparatus of claim 1, operable to twin core optical fibers, wherein each element of the array is a twin core fiber, wherein said modification is applied to a small region of the fiber, wherein tunable coupling is formed between the fiber twin cores.

6. Apparatus selectively operable as a two dimensional array of couplers or switches wherein each element of the array is an on-fiber coupler, said elements are arranged in a series and parallel connections adapted to couple the input signal of any element to the output communication line of any other element in the array, wherein each element is a tunable coupler comprising:

a first optical fiber and a second optical fiber, each of said fibers having a core and a cladding material surrounding the core, and each of said fibers having a region wherein the cladding has been removed to form a region of uncladding, said regions of uncladding being positioned parallel and close to each other while preventing mechanical movement of said fibers in relation to each other;

each fiber core is coated, in said region of uncladding, all over the 360° of the cylindrical surface, with a thin layer of metallic material to construct the inner (or first) electrode on each fiber core;

a layer of an electrooptic material is coated on the tope of each inner (first) electrode and around the two fibers as well as filling the gap between the fibers;

on the top of the electrooptic material, a layer of metallic material is coated allover the surface (360°) to construct the outer (or second) electrode, the inner and outer electrodes are used to apply electromagnetic fields to the electrooptic material in a symmetric radial directions with respect to the two fiber cores; the field lines are oriented in a symmetric configuration with respect to the fibers circular cross section in order to provide a polarization independent coupling;

a power supply for applying an external direct electric signal to said inner and outer electrodes to change the optical properties of the modified region to transfer partially or totally the optical signal from the first optical fiber to the second optical fiber;

a light source means focused to provide an optical communication signal into said first optical fiber;

detector means positioned on said each optical fiber downstream from said light source and said region of modified fibers for detecting optical signals in said optical fiber and said reference signal and transfer optical signals to electrical signals; and signal processing means coupled with said detectors means to amplify and process any output signals of said detectors, wherein said reference signal from light source is used to provide a noise free coupler outputs.

7. The apparatus of claim 6, which further includes elements having additional coating layers between each two layers of those coated materials to improve the interface and the structure properties.

8. The apparatus of claim 6, operable as a two dimensional array of tunable couplers, wherein said power supply for applying an external direct electric signal to each element of the array includes source for applying external electromagnetic fields to provide a polarization independent control signal to said modified regions to tune the coupling ratio between said first and second fibers, whereby an optical signal from said light source in said first fiber is partially transferred with an exact ratio to said second fiber.

9. The apparatus of claim 6, operable as a two dimensional array of switches, wherein said power supply for applying an external electric signal to each element of the array includes source for applying an external electromagnetic field to provide a sufficient continuous field to said modified region in order to switch off signals in first fiber of a specific element of the array.

10. The apparatus of claim 6, operable to twin core optical fibers, wherein each element of the array is a twin core fiber, wherein said modification is applied to a small region of the fiber, wherein tunable coupling is formed between the fiber twin cores.

* * * * *